No. 837,285. PATENTED DEC. 4, 1906.
R. P. CROWDER & R. B. WHEELER.
TRAP NEST.
APPLICATION FILED MAY 11, 1906.
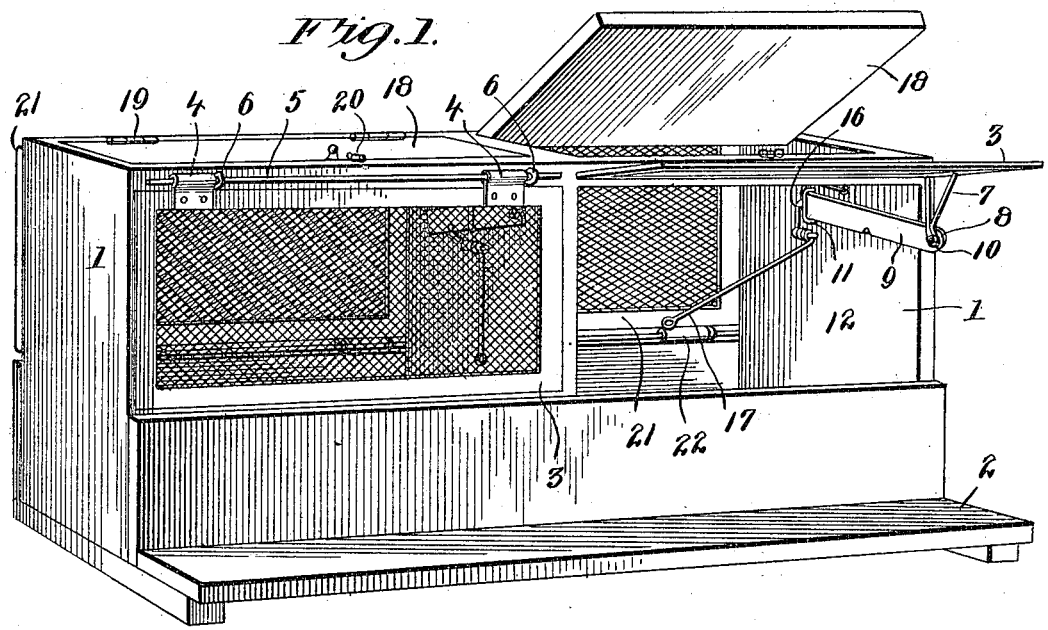
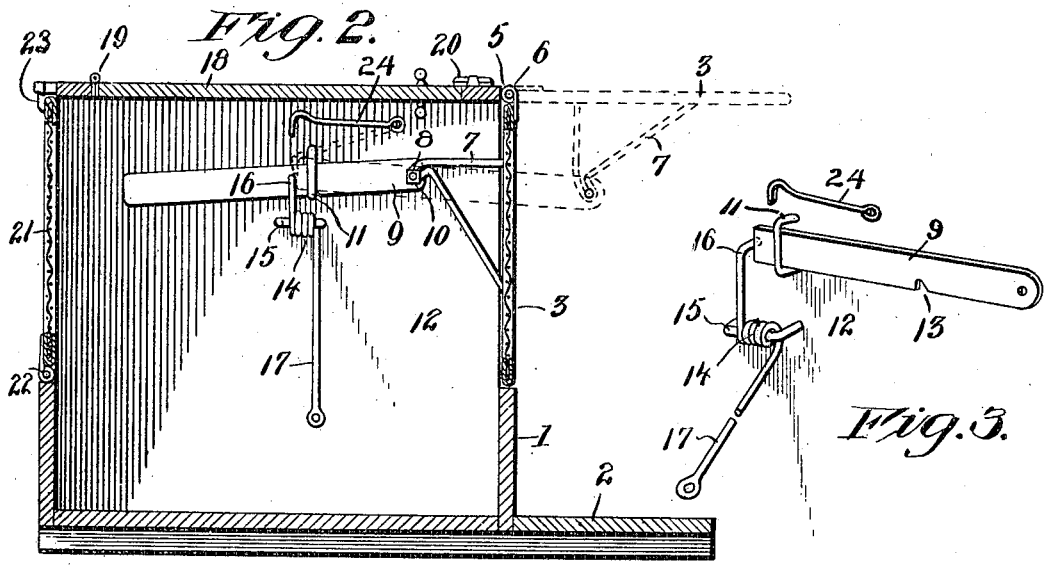

UNITED STATES PATENT OFFICE.

REGINALD P. CROWDER AND RILEY B. WHEELER, OF BETHANY, ILLINOIS.

TRAP-NEST.

No. 837,285.        Specification of Letters Patent.        Patented Dec. 4, 1906.

Application filed May 11, 1906. Serial No. 316,321.

*To all whom it may concern:*

Be it known that we, REGINALD P. CROWDER and RILEY B. WHEELER, citizens of the United States, residing at Bethany, in the county of Moultrie, State of Illinois, have invented certain new and useful Improvements in Trap-Nests, of which the following is a specification, reference being had therein to the accompanying drawings.

This invention relates to a trap-nest, and particularly to a structure in which the door or closure will be automatically shut upon the entrance of the fowl therein, and is particularly adapted for use with hens when laying and for sitting purposes.

The invention has for an object to provide an improved construction and arrangement of trip mechanism by which the door at the front of the nest may be released by means of an arm extending laterally into the nest, so as to be depressed from contact with a locking-bar when the fowl enters the nest, so as to permit the closing of the door by gravity and its locking by said bar.

Other and further objects and advantages of the invention will be hereinafter fully set forth, and the novel features thereof defined by the appended claims.

In the drawings, Figure 1 is a perspective of the invention. Fig. 2 is a cross-section through one of the nests, and Fig. 3 is a detail perspective of the trip and locking bar.

Like numerals of reference indicate like parts throughout the several views of the drawings.

The numeral 1 designates a nest, which may be of any desired size or configuration, and is preferably provided at the front with an entrance-platform 2 and with a door or closure 3, pivotally mounted at the upper edge of the nest in any desired manner—for instance, by means of the hinge-sections 4, embracing a rod 5, mounted upon the nest by means of eyes or staples 6, as shown in Fig. 1. This door is provided at its inner face with a bracket 7, extending substantially at a right angle thereto and provided with a bearing 8 at its free end, adapted to be pivotally connected with the locking-bar 9 by means of a pin or bolt 10, as shown. This bar extends through a guard or keeper 11, secured to the end wall 12 of the nest, and is provided with a locking-recess 13 in its under face, adapted to engage and seat upon the under face of the keeper when the door is closed, as shown in Fig. 2.

The door is normally retained in open or elevated position, as shown by dotted lines in Fig. 2, by means of a trip mechanism of any desired character—for instance, as herein shown, composed of a single piece of wire or other suitable metal formed with a central coiled bearing 14, adapted to embrace a pivoting bar 15, mounted in the end wall of the nest and provided with a retaining-arm 16, extended at a right angle to engage behind the end of the locking-bar 9, as shown in Figs. 1 and 3. This device is also provided with a trip-arm 17, extending diagonally downward therefrom and toward the central portion of the nest, so as to depress said arm as the fowl enters the nest, causing the retaining-finger 16 to be withdrawn from behind the locking-bar, which is then forced inward by the descending weight of the door. When the nest is to be used as an open nest, the trip-lever may be dropped out of engagement with the bar and the latter held by a hook 24 to retain the door in open position.

The door herein shown is preferably formed of screen or reticulated material, and the nest is also provided with the door 18 in the top thereof, hinged, as shown at 19, and secured by a proper turn-button 20, while at the rear of the nest the reticulated door 21 is provided and pivotally mounted at its lower end 22, so as to be retained in closed position by the turn-button 23, as shown in Fig. 2.

In the operation of the invention the door is normally retained in open position by the engagement of the retaining-arm with the locking-bar, so that the hen or fowl may readily enter the nest and when doing so depresses the trip-arm, releasing the engaging arm from the bar, so that the weight of the door forces the same inward until the locking-recess engages the keeper, when the door is firmly retained in locked position, retaining the fowl in the nest either for the purpose of laying or sitting and against any disturbance, so as to secure an absolutely automatic closing and locking of the nest. The fowl can be taken out or permitted to escape from the nest by opening either the top or back door. These top and back doors provide means by which the sitting hen may be conveniently fed or by which proper attention may be given to fowls for exhibition purposes, as ordinary among poultry-fanciers. There is an entire absence of spring and other closing means which would be liable to injure or frighten the fowls, as when the tripping-arm is engaged the frictional contact of the locking-bar causes the same to slowly close and be locked without any noise or any mechanism liable to catch and break the feathers of the fowl. The invention therefore presents a simple, efficient, and economical trap-nest adapted to meet the needs of poultry-raisers.

Having now described our invention and set forth its merits, what we claim, and desire to secure by Letters Patent, is—

1. A trap-nest comprising a door pivotally mounted at its upper edge, a locking-bar connected therewith, and tripping means for normally engaging said locking-bar to retain the door in raised position.

2. A trap-nest comprising a door pivotally mounted at its upper edge, a locking-bar connected therewith and provided with a recess therein, tripping means for normally engaging said locking-bar to retain the door in raised position, and a keeper surrounding said bar and adapted to engage said recess.

3. In a trap-nest, a door pivotally mounted at the top edge portion thereof, a bracket extending inward from said door, a locking-bar pivotally connected to said bracket, and a pivotally-mounted tripping-arm provided with retaining means to engage and retain said bar when the door is raised.

4. In a trap-nest, a door pivotally mounted at the top edge portion thereof, a bracket extending inwardly from said door, a locking-bar pivotally connected to said bracket, and a tripping device provided with a centrally-coiled bearing portion having a tripping-arm extending toward the center of the nest and a retaining-arm extended into the path of said bar.

5. In a trap-nest, a door pivotally mounted at the top edge portion thereof, a bracket extending inwardly from said door, a locking-bar pivotally connected to said bracket and having a recess in its under face, a tripping device provided with a centrally-coiled bearing portion having a tripping-arm extending toward the center of the nest and a retaining-arm extending into the path of said bar, and a keeper for said bar adapted to engage the recess therein.

In testimony whereof we affix our signatures in presence of two witnesses.

REGINALD P. CROWDER.
RILEY B. WHEELER.

Witnesses:
W. A. McGuire,
Roy Bone.